(12) United States Patent
Brinks et al.

(10) Patent No.: US 8,382,630 B2
(45) Date of Patent: Feb. 26, 2013

(54) HIGH SPEED AND CONTINUOUSLY VARIABLE TRACTION DRIVE

(75) Inventors: Barry T. Brinks, Fort Collins, CO (US); Ed VanDyne, Loveland, CO (US)

(73) Assignee: Woodward, Inc., Fort Collins, CO (US)

( * ) Notice: Subject to any disclaimer, the term of this patent is extended or adjusted under 35 U.S.C. 154(b) by 387 days.

(21) Appl. No.: 12/701,414

(22) Filed: Feb. 5, 2010

(65) Prior Publication Data

US 2011/0034295 A1 Feb. 10, 2011

Related U.S. Application Data

(60) Provisional application No. 61/231,624, filed on Aug. 5, 2009, provisional application No. 61/231,628, filed on Aug. 5, 2009.

(51) Int. Cl.
*F16H 15/48* (2006.01)

(52) U.S. Cl. ........................................ 475/185; 475/196

(58) Field of Classification Search .................. 475/183, 475/185, 189, 192, 194, 195, 196
See application file for complete search history.

(56) References Cited

U.S. PATENT DOCUMENTS

| | | |
|---|---|---|
| 236,150 A | 1/1881 | Fitch |
| 1,526,493 A | 2/1925 | Dolton |
| 1,550,796 A | 8/1925 | Gammons |
| 1,686,446 A | 10/1928 | Gilman |
| 1,691,625 A | 11/1928 | Chilton |
| 1,718,846 A | 6/1929 | Arter |
| 1,979,170 A | 10/1934 | Nardone |
| 2,076,057 A | 4/1937 | Almen |
| 2,173,595 A | 9/1939 | Schutte |
| 2,216,494 A | 10/1940 | Kurtz et al. |
| 2,278,181 A | 3/1942 | Lieberherr |
| 2,397,941 A | 4/1946 | Birkigt |
| 2,412,351 A | 12/1946 | Mount |
| 2,542,539 A | 2/1951 | Kuhrt et al. |
| 2,573,258 A | 10/1951 | Gerritsen |
| 2,585,698 A | 2/1952 | Schneider |
| 2,585,968 A | 2/1952 | Schneider |
| 2,585,986 A | 2/1952 | Andreasson |
| 2,586,725 A | 2/1952 | Schottler |
| 2,590,800 A | 3/1952 | Stephenson |
| 2,620,621 A | 12/1952 | Neftel |
| 2,652,006 A | 9/1953 | Simonson |
| 2,696,888 A | 12/1954 | Chillson et al. |
| 2,701,970 A | 2/1955 | Kraus |
| 2,803,507 A | 8/1957 | Mempel et al. |

(Continued)

FOREIGN PATENT DOCUMENTS

| | | |
|---|---|---|
| EP | 0517675 | 8/1995 |
| EP | 1400667 | 3/2004 |

(Continued)

OTHER PUBLICATIONS

U.S. Appl. No. 61/231,624, filed Aug. 5, 2009.

(Continued)

*Primary Examiner* — Justin Holmes
(74) *Attorney, Agent, or Firm* — William W. Cochran; Cochran Freund & Young LLC

(57) ABSTRACT

A fixed ratio traction drive is disclosed that uses multidiameter planet rollers. The high speed traction drive provides speed reduction from a high speed shaft. A planet carrier is used to rotationally mount the multidiameter rollers. A continuously variable transmission that uses planetary ball traction is also disclosed that provides infinitely variable speed ratios.

10 Claims, 5 Drawing Sheets

U.S. PATENT DOCUMENTS

| | | |
|---|---|---|
| 2,874,592 A | 2/1959 | Oehrli |
| 2,878,692 A | 3/1959 | Wolf |
| 2,901,924 A | 9/1959 | Banker |
| 2,905,026 A | 9/1959 | Oehrli |
| 2,913,932 A | 11/1959 | Oehrli |
| 2,941,422 A | 6/1960 | Barish |
| 2,973,671 A | 3/1961 | Elkins |
| 3,035,460 A | 5/1962 | Guichard |
| 3,044,683 A | 7/1962 | Woollenweber |
| 3,163,984 A | 1/1965 | Dumont |
| 3,203,278 A | 8/1965 | General |
| 3,237,468 A | 3/1966 | Schottler |
| 3,246,531 A | 4/1966 | Kashihara |
| 3,248,960 A | 5/1966 | Schottler |
| 3,293,945 A | 12/1966 | Stockton |
| 3,420,122 A | 1/1969 | Okabe |
| 3,423,927 A | 1/1969 | Scherenberg |
| 3,494,224 A | 2/1970 | Fellows et al. |
| 3,504,574 A | 4/1970 | Okabe |
| 3,673,797 A | 7/1972 | Wilkinson |
| 3,676,999 A | 7/1972 | Oldfield |
| 3,707,888 A | 1/1973 | Schottler |
| 3,745,844 A | 7/1973 | Schottler |
| 3,793,907 A | 2/1974 | Nakamura et al. |
| 3,988,894 A | 11/1976 | Melchior |
| 4,089,569 A | 5/1978 | Rempel |
| 4,215,549 A | 8/1980 | Daeschner |
| 4,270,400 A | 6/1981 | Fodor |
| 4,287,791 A | 9/1981 | Numazawa et al. |
| 4,312,183 A | 1/1982 | Regar |
| 4,314,485 A | 2/1982 | Adams |
| 4,345,486 A | 8/1982 | Olesen |
| 4,378,677 A | 4/1983 | Zumstein |
| 4,398,436 A | 8/1983 | Fisher |
| 4,424,726 A | 1/1984 | Galbraith |
| 4,449,370 A | 5/1984 | Ream |
| 4,489,992 A | 12/1984 | Brandenstein et al. |
| 4,570,501 A | 2/1986 | de Bris Perry |
| 4,592,247 A | 6/1986 | Mutschler |
| 4,593,574 A | 6/1986 | Sinn et al. |
| 4,616,481 A | 10/1986 | Melchior et al. |
| 4,667,525 A | 5/1987 | Schottler |
| 4,693,134 A | 9/1987 | Kraus |
| 4,700,542 A | 10/1987 | Wang |
| 4,718,781 A | 1/1988 | Gerard |
| 4,856,374 A | 8/1989 | Kreuzer |
| 5,033,269 A | 7/1991 | Smith |
| 5,037,361 A * | 8/1991 | Takahashi ............... 475/195 |
| 5,385,514 A | 1/1995 | Dawe |
| 5,397,279 A | 3/1995 | McCotter, Jr. |
| 5,458,855 A | 10/1995 | Gillbrand |
| 5,560,207 A | 10/1996 | Ramsden et al. |
| 5,713,204 A | 2/1998 | Kadlicko |
| 5,724,813 A | 3/1998 | Fenelon et al. |
| 5,729,978 A | 3/1998 | Hiereth et al. |
| 5,887,434 A | 3/1999 | Arnell et al. |
| 5,974,792 A | 11/1999 | Isobe |
| 6,041,602 A | 3/2000 | Dickey |
| 6,050,094 A | 4/2000 | Udd et al. |
| 6,050,095 A | 4/2000 | Blake |
| 6,145,313 A | 11/2000 | Arnold |
| 6,227,180 B1 | 5/2001 | Hoffmann et al. |
| 6,343,473 B1 | 2/2002 | Kanesaka |
| 6,406,399 B1 | 6/2002 | Ai |
| 6,408,626 B1 | 6/2002 | Arnell |
| 6,470,864 B2 | 10/2002 | Kim et al. |
| 6,601,388 B1 | 8/2003 | Gladden |
| 6,651,432 B1 | 11/2003 | Gray, Jr. |
| 6,681,574 B2 | 1/2004 | Berglund et al. |
| 6,725,653 B2 | 4/2004 | Brown et al. |
| 6,729,315 B2 | 5/2004 | Onodera et al. |
| 6,857,263 B2 | 2/2005 | Gray, Jr. et al. |
| 6,871,498 B1 | 3/2005 | Allen et al. |
| 6,912,852 B2 | 7/2005 | Gottemoller et al. |
| 6,960,147 B2 | 11/2005 | Kolstrup |
| 6,994,531 B2 | 2/2006 | Dairokuno et al. |
| 7,025,042 B2 | 4/2006 | Gray, Jr. |
| 7,032,382 B2 | 4/2006 | Onodera et al. |
| 7,055,507 B2 | 6/2006 | Kelley, Jr. |
| 7,237,532 B2 | 7/2007 | Gray, Jr. |
| 7,455,617 B2 | 11/2008 | Miller et al. |
| 7,491,149 B2 | 2/2009 | Greenwood et al. |
| 7,492,594 B2 | 2/2009 | Pal |
| 7,540,818 B2 | 6/2009 | Miller et al. |
| 2005/0277514 A1 | 12/2005 | Hiroyuki et al. |
| 2006/0032225 A1 | 2/2006 | VanDyne et al. |
| 2006/0070382 A1 | 4/2006 | Karlsson |
| 2007/0130094 A1 | 6/2007 | Lien et al. |
| 2007/0130946 A1 | 6/2007 | Winsor et al. |
| 2007/0130948 A1 | 6/2007 | Boehm et al. |
| 2007/0275809 A1 | 11/2007 | Miller et al. |
| 2008/0141810 A1 | 6/2008 | Miller et al. |
| 2008/0236150 A1 | 10/2008 | Jarvi |
| 2008/0282699 A1 | 11/2008 | Barthelet et al. |

FOREIGN PATENT DOCUMENTS

| | | |
|---|---|---|
| EP | 01300946 | 12/2004 |
| EP | 0994245 | 6/2005 |
| EP | 1550796 | 7/2005 |
| EP | 1711699 | 3/2007 |
| GB | 0206845 | 2/1924 |
| JP | 61164039 | 7/1986 |
| WO | 2006022635 | 3/2006 |
| WO | 2008008379 | 1/2008 |

OTHER PUBLICATIONS

U.S. Appl. No. 12/536,421, filed Aug. 5, 2009.
U.S. Appl. No. 61/086,401, filed Aug. 5, 2008.
U.S. Appl. No. 61/231,628, filed Aug. 5, 2009.
International Search Report filed in corresponding PCT Application Serial No. PCT/US10/23389, mailed May 21, 2010.

* cited by examiner

HIGH SPEED AND CONTINUOUSLY VARIABLE TRACTION DRIVE

CROSS-REFERENCED TO RELATED APPLICATIONS

The present application is based upon and claims the benefit of U.S. Provisional Patent Application Ser. No. 61/231,624, entitled "HIGH SPEED TRACTION DRIVE," filed Aug. 5, 2009, by Barry T. Brinks, and U.S. Provisional Patent Application Ser. No. 61/231,628, entitled "CONTINUOUSLY VARIABLE TRANSMISSION," filed Aug. 5, 2009, by Barry T. Brinks. The entire contents of the above-mentioned applications are hereby specifically incorporated herein by reference for all they disclose and teach.

BACKGROUND OF THE INVENTION

Mechanical coupling of various types of machine devices typically use gearing systems. Rotational mechanical energy can be transferred between machines in a manner that allows the rpm levels of the rotational mechanical energy to be adjusted.

Gears, however, are limited to rotational speeds of approximately 100,000 rpm. In fact, highly polished and specially designed gears must be used to reach these high rotational speeds. High speed rotational devices that have rotational speeds of above 100,000 exist in numerous different environments. Hence, there is a need to couple these high rotational speeds to other machines and other devices at rotational speeds in which standard gearing systems can be used.

SUMMARY OF THE INVENTION

An embodiment of the present invention may therefore comprise a traction drive comprising: a shaft having a central portion, the central portion having a shaft traction surface; a plurality of planetary rollers having a plurality of planetary roller traction surfaces that interface with the shaft traction surface so that a first plurality of traction interfaces exist between the plurality of planetary roller traction surfaces and the shaft traction surface; a ring roller that is rotated by the plurality of planet rollers through a second plurality of traction interfaces.

An embodiment of the present invention may further comprise a method of transferring rotational mechanical energy between a shaft and a ring roller comprising: providing a shaft that has a central portion, the central portion having a shaft traction surface; placing a plurality of planet roller traction surfaces of a plurality of planet rollers in contact with the shaft traction surface so that a plurality of first traction interfaces are created between the plurality of planet roller traction surfaces and the shaft traction surface; placing a ring roller in contact with the plurality of planetary rollers so that a plurality of second traction interfaces are created between the plurality of planet rollers and the ring roller; mounting the plurality of planetary rollers on a planet carrier that rotates in a direction opposite to the ring roller.

An embodiment of the present invention may further comprise a continuously variable traction drive comprising: a first race that is rotationally coupled to a shaft; a second race that is fixed with respect to the continuously variable traction drive; a third race that is rotationally coupled to the shaft and mounted in the continuously variable traction drive to allow lateral translation of the third race with respect to the first race and the second race; a fourth race that is rotationally coupled to a gear, the fourth race mounted in the continuously variable traction drive to allow lateral translation of the fourth race by an amount and in a direction that is substantially equal to the lateral translation of the third race; a plurality of traction ball bearings disposed between the first race, the second race, the third race and the fourth race.

DETAILED DESCRIPTION OF THE INVENTION

Figure 1:
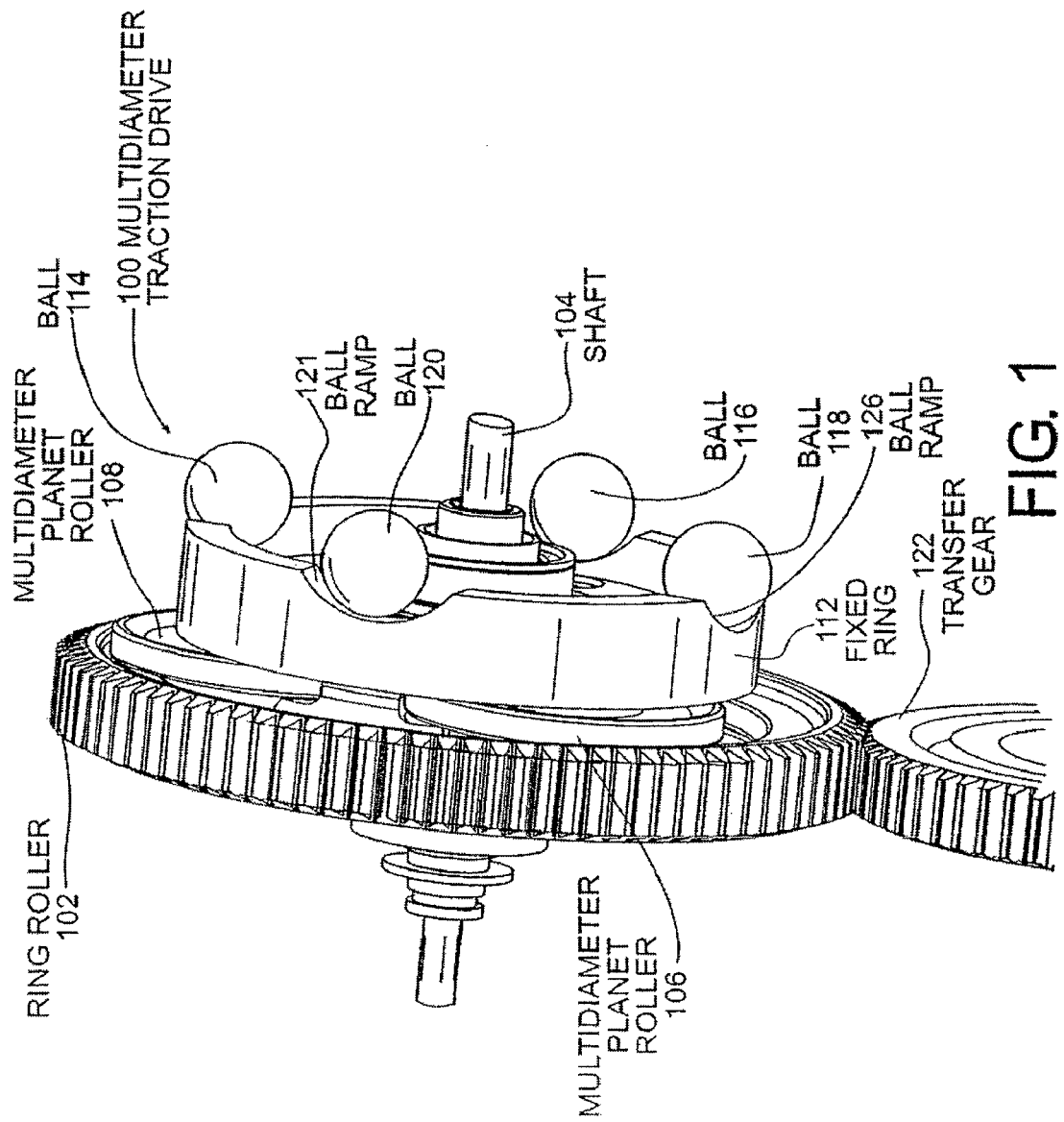
FIG. 1 is an isometric view of an embodiment of a multi-diameter traction drive.
Figure 2:
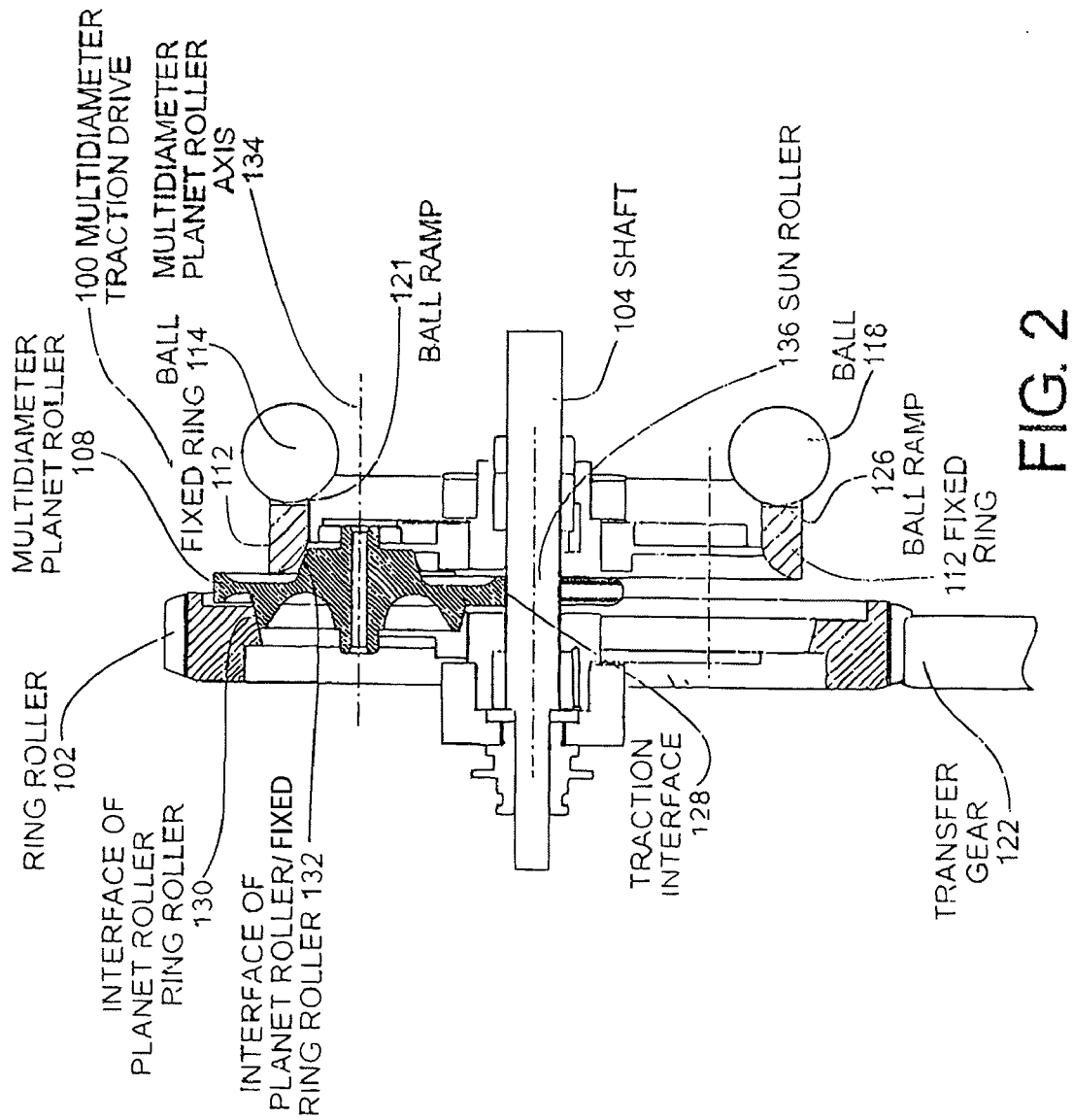
FIG. 2 is a side cutaway view of the multidiameter traction drive illustrated in FIG. 1.
Figure 3:
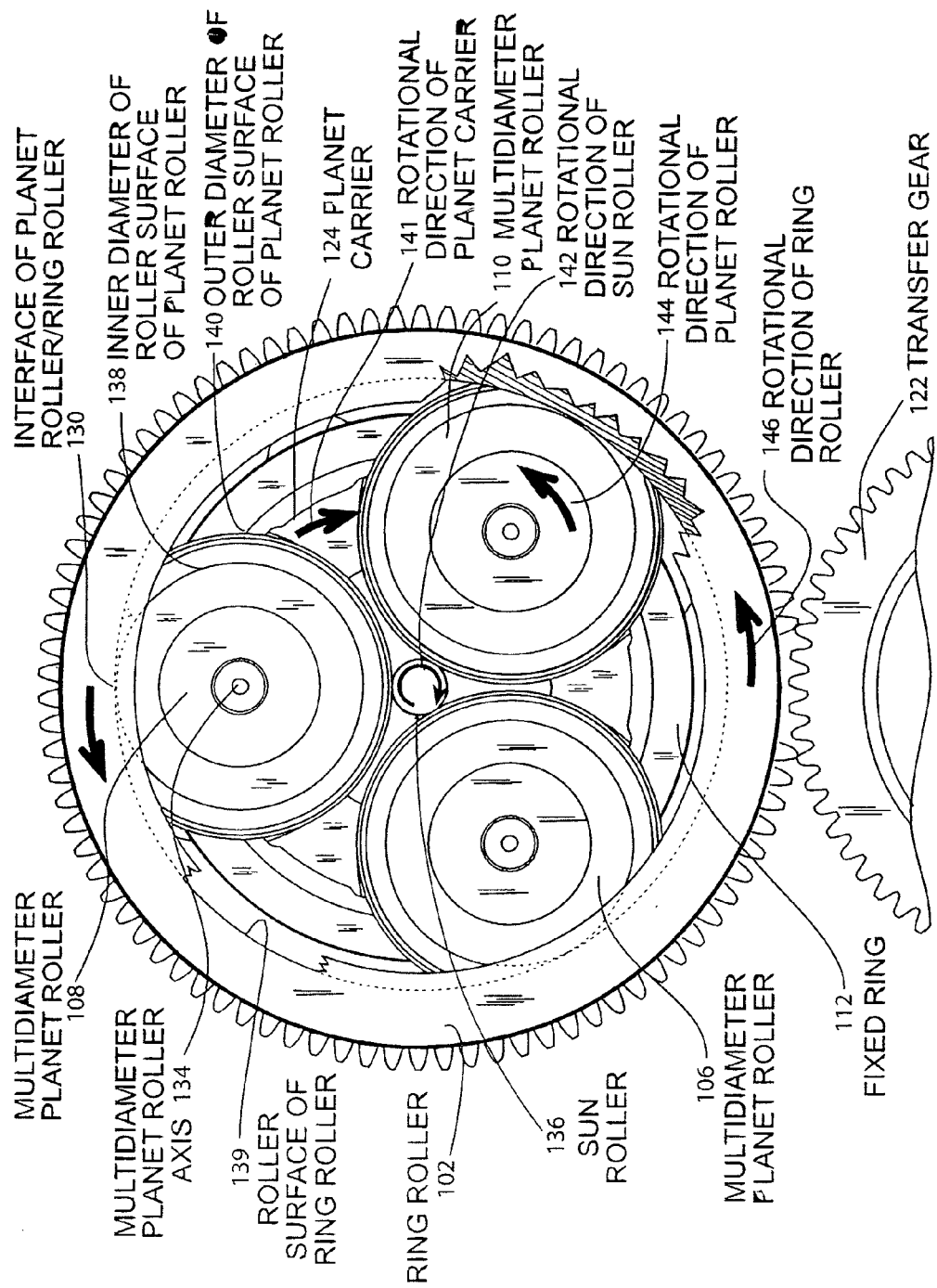
FIG. 3 is a top cutaway view of the multidiameter traction drive of FIGS. 1 and 2.

FIG. 1 is a perspective view of isolated key components of the multi-diameter traction drive 100. As shown in FIG. 1, the shaft 104 can comprise various types of shafts that can be connected to various types of devices, such as flywheels, super-turbochargers, and various other types of high speed mechanical devices. Shaft 104 passes through the center of the multi-diameter traction drive 100. The multi-diameter traction drive 100 includes multi-diameter planet rollers 664, 666 (FIG. 3), 668. These multi-diameter planet rollers are rotationally coupled to a planet carrier 124 (FIGS. 2 and 3). Balls 114, 116, 118, 120 rest on an incline surface of ball ramps, such as ball ramps 121, 126, on the fixed ring 112. Ring roller 102 is driven by an inner diameter of the multi-diameter planet rollers 106, 108, 110, as disclosed in more detail below.

FIG. 2 is a side cutaway view of the multi-diameter traction drive 100. As shown in FIG. 2, the shaft 104 is hardened and polished to form a traction surface that is used as a sun roller 136 that has a traction interface 128 with the multi-diameter planet roller 108. The multi-diameter planet roller 108 rotates around the multi-diameter planet roller axis 134. The multi-diameter planet roller 108 contacts the fixed ring 112 at the interface 132 of the planet roller 108 and the fixed ring 112. The multi-diameter planet roller 108 contacts the ring roller 102 at interface 130, which is a different radial distance from the multi-diameter planet roller axis 134, than the interface 130. FIG. 2 also illustrates the planet carrier 124 (FIG. 3) and the ball ramp 126 that intersects with the ball 118. The balls 114, 116, 118, 120 are wedged in between a housing (not shown) and the ball ramps, such as ball ramps 212, 126, on the fixed ring 112. When torque is applied to the ring roller 102, this causes the fixed ring 112 to move slightly in the direction of the rotation of the ring roller 102. This causes the balls 114-120 to move up the various ball ramps, which, in turn, causes the fixed ring 112 to press against the multi-diameter planet rollers 106, 108, 110. Since the interface 130 of the planet roller 108 and ring roller 102 is sloped, and the interface 132 of the planet roller 108 and fixed ring 112 is sloped, an inward force on the multi-diameter planet roller 108 is generated, which generates a force on the traction interface 128 to increase the traction at the traction interface 128 between the multi-diameter planet roller 108 and the sun roller 136. In addition, a force is created at the interface 130 of the multi-diameter planet roller 108 and the ring roller 102, which increases traction at interface 130. Ring roller 102 is coupled to the transfer gear 122, as also shown in FIG. 2.

FIG. 3 is a side cutaway view of the multi-diameter traction drive 100. As shown in FIG. 3, the sun roller 136 rotates in a clockwise direction, as shown by rotation direction 142. The multi-diameter planet rollers 106, 108, 110 have outer diameter roller surfaces, such as outer diameter roller surface 140 of multi-diameter planet roller 108. These outer diameter roller surfaces contact the sun roller 136 which cause the multi-diameter planet rollers 106, 108, 110 to rotate in a counter-clockwise direction, such as rotational direction 144 of multi-diameter planet roller 110. The multi-diameter planet rollers 106, 108, 110 also have an inner diameter roller surface, such as inner roller diameter roller surface 138 of multi-diameter planet roller 108. The inner diameter roller surface of each multi-diameter planet roller contacts the roller surface 138 of the ring roller 102. Hence, the interface 130 of planet roller 108 with the roller surface 138 of ring roller 102 constitutes a traction interface that transfers rotational mechanical energy when a traction fluid is applied. The interface between each of the multi-diameter planet rollers 106, 108, 110 on the sun roller 136 also constitutes a traction interface that transfers rotational mechanical energy upon application of a traction fluid.

As indicated above with respect to FIGS. 2 and 3, the fixed ring 112 generates a force, which pushes the multi-diameter planet rollers 106, 108, 110 towards the sun roller 136 to generate traction. Each of the multi-diameter planet rollers 106, 108, 110 is rotationally attached to the planet carrier 124 with planet roller axes, such as the multi-diameter planet roller axis 134 of the multi-diameter planet roller 108. These axes have a slight amount of play so that the multi-diameter planet rollers 106, 108, 110 can move slightly and create a force between the sun roller 136 and the outer diameter of the roller surface of the multi-diameter planet rollers 106, 108, 110, such as the outer diameter roller surface 140 of the planet roller 108. The movement of the multi-diameter planet roller 108 towards the sun roller 136 also increases the traction at the interface of the multi-diameter planet rollers 106, 108, 110 and the ring roller 102, since the interface between the multi-diameter planet rollers 106, 108, 110 and the ring roller 102, such as interface 130, is sloped. The contact of the multi-diameter planet rollers 106, 108, 110 with the roller surface 138 of ring roller 102 causes the planet carrier 124 to rotate in a clockwise direction, such as the rotational direction 140, illustrated in FIG. 3. As a result, the ring roller 102 rotates in a counter-clockwise direction, such as rotational direction 144, and drives the transfer gear 122 in a clockwise direction.

Figure 4:
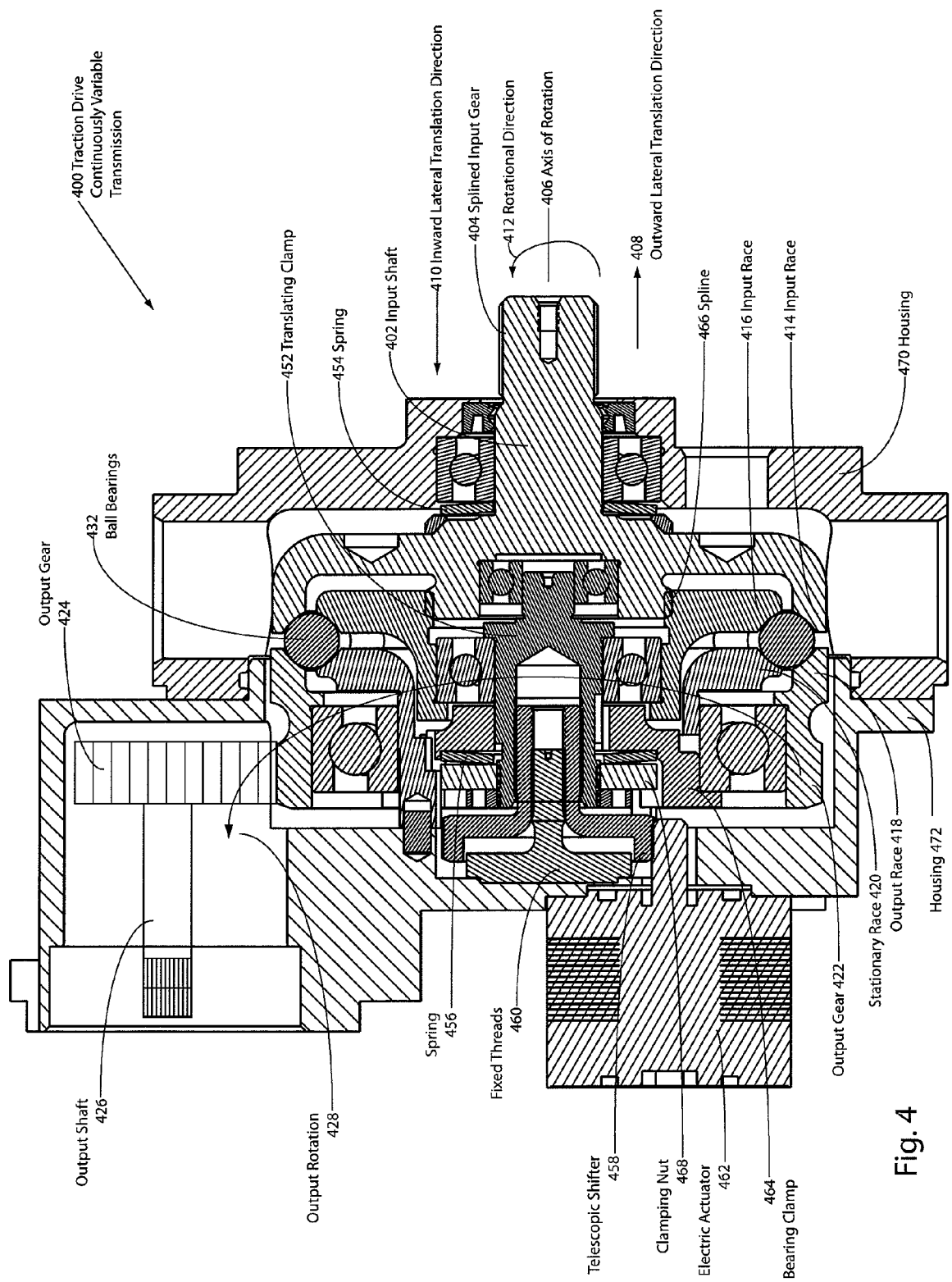
FIGS. 4 and 5 are illustrations of an embodiment of a continuously variable traction transmission.
Figure 5:
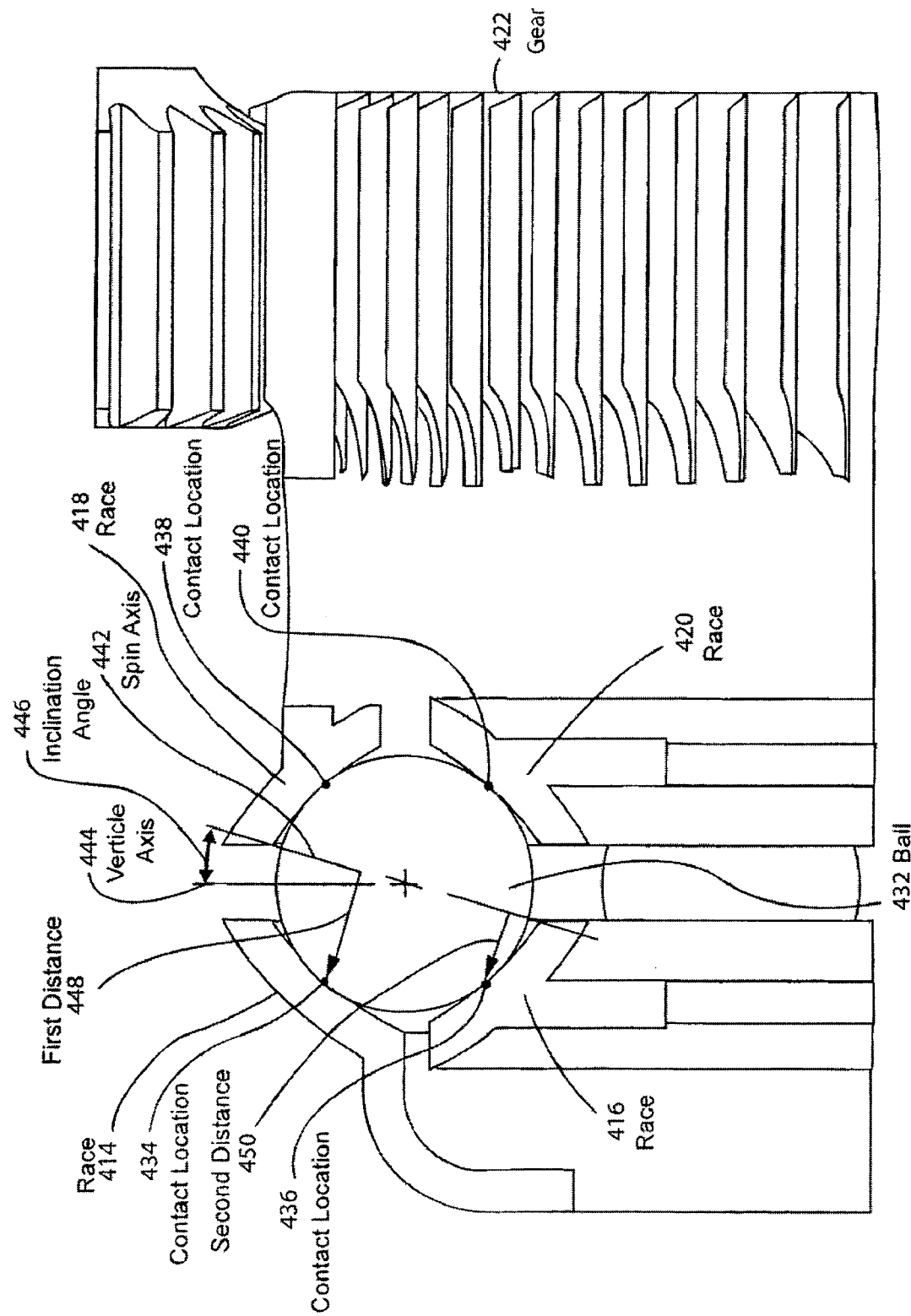

FIGS. 4 and 5 illustrate an example of a continuously variable traction drive 400. The continuously variable traction drive illustrated in FIGS. 4 and 5 operates by translating races 416, 418 in a lateral direction on race surfaces that have a radius of curvature that causes contact locations of the ball bearings to move, which, in turn, causes the balls to rotate with a different spin angle to drive race 422 at different speeds. In other words, the contact location of each of the bearings on the race surfaces is changed as a result of the lateral translation of the races 416, 418, which alters the speed at which the bearings are rotating at the contact location, as explained in more detail below.

Input torque from a source such as a super-turbocharger, an engine, or other source, is used to drive the spline input gear 404 of the input shaft 402. The input torque on the spline input gear 404 imparts a spin in rotational direction 412 on both the input shaft 402 and its associated structure including input race 414. Input race 416 is also spun around the axis of rotation 406 in response to the torque imparted by spline 466 from the input shaft 402 to the input race 416. The rotation of the input shaft 402, input race 414 and input race 416 impart a spin on the plurality of ball bearings 432 because the stationary race 420 impedes the rotation of the ball bearings at the contact point with stationary race 420. Input race 414 and input race 416 rotate at the same angular speed since they are coupled together through spline 466. Input race 414 and input race 416 cause the ball bearings 432 to spin in a substantially vertical orientation since the ball bearings 432 contact the stationary race 420. The contact of the ball bearings 432 against the stationary race 420 also causes the ball bearings 432 to precess around the perimeter of the races 414, 416, 418, 420. In the embodiment illustrated in FIG. 4, there may be as many as 20 ball bearings 432 that rotate on the surfaces of the races 414, 416, 418, 420. The rotation of the ball bearings 432 as a result of being driven by input race 414 and input race 416 creates a tangential contact of the ball bearings 432 on the output race 418. Depending upon the contact position of the ball bearings 432 on the output race 418, the ratio of the rotational speed of the input races 414, 416 with respect to the output race 418 can be varied. Output race 418 is coupled to output gear 422. Output gear 422 engages output gear 424, which in turn is connected to the output shaft 426.

The manner in which the traction drive continuously variable transmission 400, illustrated in FIG. 4, shifts the ratio between the input shaft 402 and the output shaft 426 is accomplished by changing the relative position of the contact point between the four races 414, 416, 418, 420 that are in contact with the ball bearings 432. The manner in which the contact surfaces of the races 414, 416, 418, 420 with the ball bearings 432 is changed is by shifting the position of the translating clamp 452. The translating clamp 452 is moved horizontally, as illustrated in FIG. 4, in response to electric actuator 462. Electric actuator 462 has a shaft that engages the telescopic shifter 458 and rotates the telescopic shifter 458. Telescopic shifter 458 has different thread types on an inside portion and an outside portion. A difference in thread pitch of the different thread types causes the translating clamp 452 to translate horizontally in response to rotation of the shaft of the electric actuator 462, which imparts rotation in the telescopic shifter 458. Lateral translation of the translating clamp 452, which is in contact with bearing clamp 464, causes lateral transition of input race 416 and output race 418. Lateral translation of the input race 416 and output race 418 may vary, in the embodiment illustrated in FIG. 4, by approximately one-tenth of an inch. The translation of the input race 416 and the output race 418 changes the angle of contact between the ball bearings 432 and the output race 418, which changes the ratio, or speed at which the ball bearings 432 are moving in the races because of a change in contact angle between the stationary race 420 and input race 414 and input race 416. The combination of the change in angle between the races allows the contact velocity, or the point of contact between the ball bearings 432 and output race 418, to vary which results in a variation of speed of between 0 percent of the rotational speed of the input shaft 402 up to 30 percent of the rotational speed of the input shaft 402. The variation of speed in the output race 418 of 0 percent to 30 percent of the rotational speed of the input shaft 402 provides a wide range of adjustable rotational speeds that can be achieved at the output shaft 426.

To ensure proper clamping of the ball bearings 432 between the races 414, 416, 418, 420, springs 454, 456 are provided. Spring 454 generates a clamping force between input race 414 and stationary race 420. Spring 456 generates a clamping force between input race 416 and output race 418. These clamping forces against the ball bearings 432 are maintained over the entire translating distance of the translating clamp 452. The telescopic shifter 458 has threads on an inside surface that connect to the threads on the fixed threaded device 460. The fixed threaded device 460 is fixed to housing 472 and provides a fixed position relative to the housing 472 so that the translating clamp 452 is able to translate in a horizontal direction as a result of the differential threads on the two sides of the telescopic shifter 458.

As also illustrated in FIG. 4, the rotating components of the traction drive continuously variable transmission 400 all rotate in the same direction, i.e. rotational direction 412 and output rotation 428 of the output gear 422. Clamping nut 468 holds spring 456 in place and preloads the spring 456 to create the proper diagnonal pressure between stationary race 420 and input race 414. When the translating clamp 452 is horizontally translated, as illustrated in FIG. 4, there is a slight translation of the input shaft 402 based upon the angles of the races 414-420 that contact the ball bearings 432. The spline input gear 404 allows translational movement in directions 408, 410 based upon the points at which the ball bearings 432 contact the races 414-420 and the particular contact angle of the races with respect to the ball bearings 432. Housing 470 is bolted tightly to housing 472 to contain the spring 454, which creates the proper amount of clamping force between input race 414 and stationary race 420. Ball bearings 432, as illustrated in FIG. 4, have a rotational progression 431 in the four races 414, 416, 418, 420. The rotational direction 412 of the shaft 402 causes the gear 422 to rotate in a rotational direction 428, as illustrated in FIG. 4.

FIG. 5 is a closeup view of the races 414-420 and ball 432, illustrating the operation of the traction drive continuously variable transmission 400. As shown in FIG. 5, race 414 forcibly contacts ball 432 at contact location 434. Race 416 forcibly contacts ball 432 at contact location 436. Race 418 forcibly contacts ball 432 at contact location 438. Race 420 forcibly contacts ball 432 at contact location 440. Each of the contact locations 434, 436, 438, 440 is located on a common great circle on the surface of the ball 432. The great circle is located in a plane that contains the center of the ball 432 and the axis 406 of the shaft 402. Ball 432 spins about a spin axis 442 passing through the center of the ball 432 and bisects the great circle containing contact locations 434, 436, 438, 440. The spin axis 442 of the ball 432 is inclined at an angle 446 with the vertical axis 444. The inclination angle 446 is the same for each of the balls disposed in the races around the circumference of the traction drive 400. The inclination angle 446 establishes a mathematical relationship between a distance ratio and a circumferential velocity ratio. The distance ratio is the ratio between the first distance 448, which is the orthogonal distance from the spin axis 442 to the contact location 434, and a second distance 450, which is the orthogonal distance from the spin axis 442 to contact location 436. This distance ratio is equal to the circumferential velocity ratio. The circumferential velocity ratio is the ratio between the first circumferential velocity and the second circumferential velocity, where the first circumferential velocity is the difference between the circumferential velocity of ball 432 at race 414 and a common orbital circumferential velocity of ball 432 and the other balls in the races, while the second circumferential velocity is the difference between the circumferential velocity of the ball 432 on the race 416 and the common orbital circumferential velocity of the ball 432, as well as the other balls disposed in the races. The radius of curvature of each of the races 414-420 is larger than the radius of curvature of ball 432. In addition, the radius of curvature of each of the races 414-420 need not be a constant radius of curvature, but can vary. Further, the radius of curvature of each of the four races does not have to be equal.

When races 416, 418 translate simultaneously in a lateral direction, such as lateral translation direction 408, the speed ratio of the rotation of shaft 402 and the rotational direction 412 change with respect to the rotation of the gear 422 and rotational direction 428. Translation of races 416, 418 in lateral translation direction 408 causes the first distance 448 to be larger and the second distance 450 to be smaller. Hence, the ratio of distances, as well as the circumferential velocity ratio, changes, which changes the rotational speed of the gear 422 with respect to shaft 402.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A traction drive comprising:
   a shaft having a central portion, said central portion having a shaft traction surface;
   a plurality of planetary rollers having a plurality of outer planetary roller traction surfaces that interface with said shaft traction surface to form a first plurality of traction interfaces between said plurality of outer planetary roller traction surfaces and said shaft traction surface that cause rotational mechanical energy to be transferred between said shaft and said plurality of planetary rollers, and a plurality of inner planetary roller traction surfaces that are located radially inwardly from said plurality of outer planetary roller traction surfaces;
   a ring roller having a ring roller traction surface that interfaces with said plurality of inner planetary roller traction surfaces to form a second plurality of traction surfaces between said inner planetary roller traction surfaces and said ring roller traction surfaces that cause rotational mechanical energy to be transferred between said plurality of planetary rollers and said ring roller;
   a ring gear disposed on said ring roller that allows rotational mechanical energy to be transferred between said ring roller and a transfer gear.

2. The traction drive of claim 1 wherein said plurality of planet rollers comprise at least two planet rollers.

3. The traction drive of claim 1 wherein said plurality of planet rollers comprise at least three planet rollers.

4. The traction drive of claim 3 wherein said traction drive further comprises a planet carrier on which said plurality of planet rollers are mounted.

5. The traction drive of claim 4 wherein said plurality of planet rollers include an additional traction surface that interfaces with a fixed ring.

6. The traction drive of claim 5 wherein said shaft comprises a single shaft that extends through said traction drive.

7. A method of transferring rotational mechanical energy between a shaft and a ring roller comprising:
   providing a shaft that has a central portion, said central portion having a shaft traction surface;
   providing a plurality of planet rollers having outer planet roller traction surfaces and inner planet roller traction surfaces that are located radially inwardly from said outer planet roller traction surfaces on said plurality of planet rollers;
   placing said plurality of outer planet roller traction surfaces in contact with said shaft traction surface to form a plurality of first traction interfaces between said plurality of outer planet roller traction surfaces and said shaft traction surface that cause rotational mechanical energy to be transferred between said shaft and said plurality of planetary rollers;

providing a ring roller having a ring roller traction surface and a ring roller gear;

placing said inner planetary roller traction surfaces in contact with said ring roller traction surface to form a plurality of second traction interfaces between said inner planetary roller traction surfaces and said ring roller traction surface that cause rotational mechanical energy to be transferred between said planetary rollers and said ring gear;

transferring rotational mechanical energy between said ring roller gear and a transfer gear.

8. The method of claim 7 wherein said process of providing a shaft comprises:

providing a shaft that extends through said ring roller.

9. The method of claim 7 further comprising:

mounting said plurality of planet rollers on a planet roller carrier;

mounting said planet roller carrier so that said planet roller carrier can rotate with respect to said ring roller and said shaft.

10. The method of claim 7 wherein said process of forming a plurality of first traction surfaces comprises:

forming three of said first traction surfaces using three of said planet rollers.

* * * * *